United States Patent Office 3,647,902
Patented Mar. 7, 1972

3,647,902
PROCESS FOR PREPARING 1,4-HEXADIENE
Gisela Henrici Henrici and Salvador Olivé Martin, Zurich, Switzerland, assignors to Monsanto Company, St. Louis, Mo.
No Drawing. Filed Sept. 25, 1969, Ser. No. 861,499
Claims priority, application Switzerland, Oct. 2, 1968, 14,875/68
Int. Cl. C07c 3/10
U.S. Cl. 260—680 B        6 Claims

ABSTRACT OF THE DISCLOSURE

An improved process for preparing 1,4-hexadiene by reaction of ethylene and 1,3-butadiene under pressure in a solvent and in an inert atmosphere in the presence of a catalytic system of a combination of cobalt (II) chloride 1,2-bis-(diphenylphosphino)-ethane and triethyl aluminum wherein the solvent is 1,2-dichloroethane, the concentration of cobalt is no greater than 0.0005 mol of cobalt (II) chloride per liter of reaction mixture, the molar ratio of triethyl aluminum to cobalt chloride is at least 200, and the reaction mixture is brought to a temperature of at least 80° C. before the reaction of ethylene with 1,3-butadiene occurs.

---

The present invention relates to a process for preparing 1,4-hexadiene by reaction of ethylene and 1,3-butadiene under pressure in a solvent and in an inert atmosphere in the presence of a catalytic system made by a combination of cobalt (II) chloride 1,2-bis-(diphenylphosphino)-ethane and triethyl aluminum.

The process is characterized in that 1,2-dichloroethane is used as a solvent, the maximum concentration of cobalt is 0.0005 mol of cobalt (II) chloride per liter of liquid reaction mixture, the molar ratio of triethyl aluminum to cobalt (II) chloride is at least 200, and that the reaction mixture has a temperature of at least about 80° C. before the reaction of the ethylene with the 1,3-butadiene is started.

It has been known to prepare 1,4-hexadiene in the presence of the above described catalytic system which probably contains a coordinatively unsaturated cobalt (I) hydride complex as active constituent [Masao Iwamoto and Sadao Yuguchi, Bull. Chem. Soc. Japan 41, 150 (1968)]. A cobalt (II) chloride concentration lying about between 0.005 and 0.001 mol per liter of liquid reaction mixture (solvent+butadiene) has been used, and thereby the molar ratio Al/Co has been in the range of about 8 to 72. From the reported experiments it is apparent that with a rising ratio Al/Co the conversion of 1,3-butadiene increases; however the formation of undesired by-products (2,4-hexadiene, $C_8$ products and polymers) simultaneously is promoted. Moreover, it is apparent that among different solvents tested, toluene is the most convenient one as compared with chlorobenzene, n-heptane, tetrachloroethane and 1,2-dichloroethane. The statement is found about 1,2-dichloroethane that it has been impossible to keep the reaction temperature under control with same, so that side reactions occurred to a considerable extent leading to undesirable by-products. The previously described experiments yielding the most favorable results have been carried out by heating the reaction mixture in a pressure vessel using an ethylene pressure of 50 or 55 kg. per cm.² at 80 to 100 °C. for 2 hours. It has now been found that control of the temperature is quite feasible, even when using 1,2-dichloroethane, if the concentration of cobalt is essentially lower, for example, only 0.0001 mol per liter of liquid reaction mixture. Nevertheless, considerable amounts of by-products still are formed if the following described mode of action is not observed. Under the conditions previously described in the art, there are formed, for example, 1,4-hexadiene and $C_8$ products in a ratio of about 1:1. A further checking of the reaction mechanism taking place has shown that before the proper reaction, which is recognizable by a strong increase of the ethylene consumption, a relatively short time interval of about 2 to 5 minutes regularly appears in which there is not yet a noteworthy consumption of ethylene occurring. As an important fact it is now recognized that the reaction of ethylene with 1,3-butadiene can be permitted only at at least 80° C. When the reaction mixture is heated up beginning at a lower temperature and under ethylene pressure, the reaction mixture must have reached a temperature of at least 80° C. before or with expiration of the induction period. This mode of action also has not been considered in the previous process. If after expiration of the induction period the reaction mixture has reached, e.g., only 70° C., there are obtained extremely bad results as mentioned above, i.e. the formation of by-products in a ratio even of 1:1 (cf. Table I, Run 22). Thus, if the reaction mixture is not heated from room temperature to at least 80° C. within about 5 minutes (expiration of the maximal induction period), poor results are obtained. It is understood that in a batch process on a technical scale such short heating up times either cannot be observed at all or only with great risks. Therefore, the ethylene is pressurized expediently at temperatures of 80 to 100° C.

According to the known process when using the lowest cobalt concentration employed of about 0.001 mol per liter, a good conversion of the butadiene will be obtained only when simultaneously a high Al/Co ratio of about 72 is used, however with such increasing ratio a fast increase of undesirable by-products occurs. Consequently, it is very surprising that on using an essentially lower cobalt concentration of at maximum about 0.0005 and preferably 0.0001 mol per liter, a conversion of butadiene of almost 100% is still reached, and that simultaneously with an essentially greater Al/Co ratio of at least 200 and preferably 350, nevertheless insignificant amounts of by-products are formed (compare Table I, Runs 21 and 25). The high Al/Co ratio is necessary, because if a normal one of say 35 is used, the conversion of butadiene is only about 6%.

It has further been found that in the instant process the pressure can be kept lower than 50 to 55 kg. per cm.². For example, an ethylene pressure of say 30 kg. per cm.² has been found to be very suitable. It is clear that, consequently, the safety requirements of the autoclave will be much less, from which requirements of the autoclave will be much less, from which further technical advantages will result.

By the process of the invention using 1,2-dichloroethane as a solvent it is possible to prepare up to 6300 kg. of 1,4-hexadiene per mol of $CoCl_2 \cdot (C_6H_5)_2PCH_2CH_2P(C_6H_5)_2$ per hour, whereas the previously known process using toluene as a solvent produces only 225 kg. of 1,4-hexadiene.

The process can be carried out as a batch process as well as a continuous process. Of course, in the last case the prepared reaction mixture will be pressurized with ethylene only when it has reached at least 80° C., or the reaction mixture under ethylene pressure is heated so fast up to at least 80° C. that the induction period has not expired while at lower temperature.

Some experiments according to the new process are compared with the best experiments of the previously known process:

EXAMPLES

The following chemicals are used:

Butadiene: Research grade, Phillips Petroleum, Bartlesville (Oklahoma, USA)

Ethylene: Polymerization grade, Monsanto Chemicals Ltd., Fawley Works (England)

Triethyl aluminum: Schering AG, Werke Bergkamen (Germany) Used without further purification 1,2-Bis-(diphenylphosphino)-ethane: Strem Chemicals Inc., Danvers (Mass., USA) Used without further purification 1,2-Dichloroethane: Fluka AG, Buchs (Switzerland) Refluxed with $CaH_2$ before using $CoCl_2$: Fluka AG, Buchs (Switzerland) Dried under Vacuo at 120° C. for 2 hours Into an evacuated autoclave cooled to −60 to −80° C. butadiene is distilled in from a graduated container maintained at about −20° C. The complex solution, $CoCl_2 \cdot$ 1,2-Bis-(diphenylphosphino)-ethane is prepared separately in a flask by distilling the necessary amount of solvent onto an aliquot part of the mother complex solution. Then the corresponding amount of triethyl aluminum is added under argon with a medical syringe. The light greenish solution turned yellow at this dilution and is injected under argon into the autoclave. The latter is rapidly heated in a jacket to the desired temperature at which ethylene is introduced. A pressure of 30 kg. per cm.² is chosen. The pressure is maintained between 30 and 25 kg. per cm.² during the reaction time. After one hour the autoclave is cooled down to +5° C. and vented through a trap cooled with methanol and $CO_2$, and the condensate is measured by volume. After opening of the autoclave the volume and weight of the reaction solution is determined. The appearance of the liquid is not changed, but volume and weight are increased. The liquid is washed with water to remove salts, and then distilled. The distillates are used for further analysis. VPC, IR, NMR and MS are used to identify quantitatively and qualitatively the relevant products. Authentic samples of 1,4-hexadiene and 2,4-cis-cis-hexadiene were supplied by "Chemical Samples Co.," Columbus, (Ohio, USA).

In Run 17 ethylene was pressurized into the autoclave at 50° C. and at the end of the induction period the reaction temperature was 100° C. This temperature was maintained during the experiment.

From Runs 15 and 16 it is apparent that a decrease of the Al concentration causes an increase in selectivity, but to the detriment of total conversion.

From Run 21 it is apparent that an increase of the butadiene concentration in the reaction mixture causes a favorable effect on the selectivity.

Run 25: A considerable improvement can also be obtained when the reaction mixture is heated to 70° C. before ethylene is added.

In Run 22 ethylene was pressurized in at 30° C. and the reaction mixture so heated up that after expiration of the induction period it had a temperature of about 70° C. The ethylene consumption was about 1.5 fold of the stiochiometric amount based on a reaction 1:1 with butadiene. From the mass spectrum it is apparent that the products $C_6$ and $C_8$ are present in a ratio of 1:1, i.e. the fraction mentioned in Column 7 of Table I consists mainly of $C_8$ products.

In a further run the reacted reaction mixture is heated without ethylene at 100° C. for a further hour. No isomerization of the 1,4-hexadiene occurs with the concentrations employed herein of the components of the catalytic system.

TABLE I

[Reaction of ethylene and 1,3-butadiene in presence of $CoCl_2 \cdot 2(C_6H_5)_2PCH_2CH_2P(C_6H_5)_2$ and triethyl aluminum in 1,2-dichloroethane at 30 kg. per cm.² and 100° C. for 1 hour]

| Number: | $CoCl_2$, mmol/l. | $Al(C_2H_5)_3$, mmol/l. | 1,3-butadiene, mol/l. | Conversion, percent [a] | 1,4-hexadiene, percent [b] | Other $C_6$-plus $C_8$-products | Oligomers equal polymers, percent [b] |
|---|---|---|---|---|---|---|---|
| 17 | 0.1 | 35 | 6.2 | 98 | 84 | 15 | 0.5 |
| 15 | 0.1 | 7 | 6.2 | 83 | 91 | 3.7 | 5.0 |
| 16 | 0.1 | 3.5 | 6.2 | 6 | 100 | | |
| 10 | 1.0 | 45 | 6.2 | 94 | 84 | 14 | 1.5 |
| 21 | 0.1 | 35 | 8.3 | 98 | 94.5 | 5 | 0.5 |
| 25 [c] | 0.1 | 35 | 6.2 | 95 | 98 | 2 | 0.5 |
| 22 [c] | 0.1 | 35 | 6.2 | 98 | 48 | 50 | 2.0 |

[a] Referred to the butadiene charged.
[b] Mol 1,4-hexadiene/mol butadiene reacted×100.
[c] Explanations in the text.

TABLE II

[The best results from the literature [d] in the presence of the same catalytic system in toluene at 80 to 90° C.]

| $CoCl_2$, mmol/l. | $Al(C_2H_5)_3$, mmol/l. | Pressure, kg./cm.² | Time, hrs. | 1,3-butadiene, mmol/l. | Conversion, percent [a] | 1,4-hexadiene, percent [b] | Other products, percent [b] |
|---|---|---|---|---|---|---|---|
| 0.98 | 41 | 25 | 2 | 10.0 | 61.6 | 97 | 2.6 |
| 0.98 | 70 | 55 | 2 | 6.2 | 99.4 | 90.2 | 8.8 |
| 0.70 | 28 | 50 | 5 | 10.8 | 44.5 | 90.5 | 10.0 |
| 1.6 | 40 | 50 | 2 | 6.2 | 100 | 91.5 | 8.5 |

[a][b] See Table I.
[d] Iwamoto and Yuguchi, Bull. Chem. Soc. Japan 41, 150 (1968).

What is claimed is:

1. In a process for preparing 1,4-hexadiene by reaction of ethylene and 1,3-butadiene under pressure in a solvent and in an inert atmosphere in the presence of a catalytic system composed of Co (II) chloride and 1,2-bis(diphenylphosphino)ethane and triethyl aluminum, the improvement of using 1,2-dichloroethane as the sole solvent and of using a molar ratio of triethyl aluminum to cobalt (II) chloride of at least 200 and of bringing the reaction mixture to a temperature of at least about 80° C. before the reaction of the ethylene with the 1,3-butadiene occurs.

2. The process according to claim 1, characterized in that the Co concentration is 0.0001 mol of cobalt(II) chloride per liter.

3. The process according to claim 1, characterized in that the ratio of triethyl aluminum to Co(II) chloride is about 350.

4. The process according to claim 1, characterized in that the reaction mixture is at a temperature of about 70° C. at the beginning of the admission of ethylene.

5. The process of claim 1 wherein the reaction of ethylene and 1,3-butadiene is carried out at a temperature between about 80° C. and about 100° C.

6. The process according to claim 1, characterized in that the ethylene pressure is maintained at about 30 kg. per cm.$^2$.

References Cited

UNITED STATES PATENTS 3,405,194  10/1968  Iwamoto et al. _____ 260—680

OTHER REFERENCES

Iwamoto et al, Bulletin of the Chemical Society of Japan, vol. 41 (1968), pp. 150–155.

PAUL M. COUGHLAN, JR., Primary Examiner